US012450961B2

(12) United States Patent
Pasma et al.

(10) Patent No.: US 12,450,961 B2
(45) Date of Patent: Oct. 21, 2025

(54) ELECTRONIC LOCKSET FOR SLIDING DOOR

(71) Applicant: ASSA ABLOY Americas Residential Inc., New Haven, CT (US)

(72) Inventors: Kevin Pasma, Lake Forest, CA (US); Zachary Keoki Hong, Irvine, CA (US); Wei Hsu, Lake Forest, CA (US); Oscar Romero, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 103 days.

(21) Appl. No.: 18/472,410

(22) Filed: Sep. 22, 2023

(65) Prior Publication Data

US 2024/0104984 A1 Mar. 28, 2024

Related U.S. Application Data

(60) Provisional application No. 63/377,277, filed on Sep. 27, 2022.

(51) Int. Cl.
*G07C 9/00* (2020.01)

(52) U.S. Cl.
CPC ..... *G07C 9/00182* (2013.01); *G07C 9/00944* (2013.01); *G07C 2009/00769* (2013.01)

(58) Field of Classification Search
CPC .......... E05B 83/28; E05B 83/40; E05B 47/00; E05B 47/0012; E05B 2047/0094;
(Continued)

(56) References Cited

U.S. PATENT DOCUMENTS

| | | | | |
|---|---|---|---|---|
| 8,610,535 B2 * | 12/2013 | Hui | E05B 13/002 709/219 |
| 8,860,574 B2 * | 10/2014 | Grant | E05B 41/00 70/57.1 |
| 2021/0054659 A1 * | 2/2021 | Hill | E05B 17/2007 |

FOREIGN PATENT DOCUMENTS

| | | |
|---|---|---|
| CN | 208152759 U * | 11/2018 |
| CN | 213927897 U * | 8/2021 |

(Continued)

OTHER PUBLICATIONS

PCT International Search Report and Written Opinion in Application PCT/US2023/074850, mailed Jan. 17, 2024, 10 pages.

(Continued)

*Primary Examiner* — Nathan Cumar
(74) *Attorney, Agent, or Firm* — Merchant & Gould P.C.

(57) ABSTRACT

Generally, methods and systems related to electronic locksets for sliding doors are disclosed. One method of installing an electronic lockset includes mounting a strike plate with a retaining groove on a top portion of the sliding door, attaching a lock assembly behind a rail of the sliding door. The lock assembly including a locking tab coupled to a motor to actuate the locking tab between an extended position and a retracted position. The method further comprising wirelessly connecting a control device to the electronic lockset. Where the control device configured to send actuation commands to the electronic lockset to move the locking tab between the extended position and the retracted position and the strike plate and lock assembly are configured to be installed such that the electronic lockset is in a locked position when the locking tab is in alignment with the retaining groove and is in the extended position.

20 Claims, 12 Drawing Sheets

(58) Field of Classification Search
CPC ..... E05B 2047/0095; E05B 2047/0048; E05B 2047/0054; G07C 9/00174; G07C 9/00182; G07C 9/00944; G07C 2009/00753; G07C 2009/00769
USPC .............................................................. 70/57
See application file for complete search history.

(56) References Cited

FOREIGN PATENT DOCUMENTS

| | | | | | | |
|---|---|---|---|---|---|---|
| JP | 2005163361 | A | * | 6/2005 | | |
| KR | 10-2003-0095940 | A | | 12/2003 | | |
| KR | 2003095940 | A | * | 12/2003 | ......... | E05B 47/0003 |

OTHER PUBLICATIONS

PCT International Preliminary Report on Patentability in Application PCT/US2023/074850, mailed Apr. 10, 2025, 7 pages.

* cited by examiner

ELECTRONIC LOCKSET FOR SLIDING DOOR

CROSS-REFERENCE TO RELATED APPLICATION(S)

This application claims the benefit of priority to U.S. Provisional Application No. 63/377,277, filed Sep. 27, 2022, the disclosure of which is incorporated herein by reference.

TECHNICAL FIELD

This disclosure relates to the field of door locks. More particularly, this disclosure relates to electronic locksets for sliding doors.

BACKGROUND

Sliding interior doors mounted across doorways on exposed roller brackets (known as "barn doors"), have become very popular recently. Such sliding doors are often hung using a roller bracket and will slide along a rail mounted above a doorway, e.g., either inside or outside the doorway. Traditional locks provide a privacy locking function on an interior door (bathroom, bedroom, home office, TV room, etc.). Although sliding doors are popular for aesthetic reasons, such traditional locks are not suitable for use with sliding doors. Still further, because sliding doors may be hung from rails positioned either inside or outside of the room in which a privacy locking function is desired, any existing locking solutions may not be suitable for all mounting possibilities.

Existing solutions have a number of shortcomings. For example, in some instances, locking mechanisms can only lock the door on one side, such as in the case of a hook-and-eye. Still further, in some instances, locks can only be installed either on the outside or the inside of the door exclusively, and therefore separate solutions are required for each possible installation configuration, leading to consumer confusion at a point of sale.

Additionally, such traditional sliding door locks having privacy lock features lack the ability to be unlocked from the "other" (outside) side of the door in the case of an emergency situation (e.g., a child not able to unlock the door from within the room in which privacy is sought).

SUMMARY

The present disclosure relates generally to electronic door locks, specifically for sliding doors. Generally, a sliding door electronic lockset as described can be installed on a sliding door located on the interior or exterior of a room.

In one aspect, an electronic lockset for a sliding door is disclosed. The electronic lockset comprises a strike plate with a retaining groove configured to be installed on a top portion of the sliding door and a lock assembly configured to be installed on a rail of the sliding door. The lock assembly comprises a locking tab in mechanical communication with a motor to actuate the locking tab between an extended position and a retracted position, and a processor in wireless communication with a control device, wherein the processing unit is configured to execute instructions to perform receiving an actuation command from the control device and actuating the locking tab between the extended position and the retracted position in response to the actuation command. The strike plate and lock assembly are configured to be installed such that the electronic lockset is in a locked position when the locking tab is in alignment with the retaining groove of the strike plate and is in the extended position.

In another aspect, a method of installing an electronic lockset on a sliding door is disclosed. The method comprises mounting a strike plate with a retaining groove on a top portion of the sliding door, attaching a lock assembly behind a rail of the sliding door, wherein the lock assembly includes a locking tab coupled to a motor to actuate the locking tab between an extended position and a retracted position, and wirelessly connecting a control device to the electronic lockset, wherein the control device is configured to send actuation commands to the electronic lockset to move the locking tab between the extended position and the retracted position. The strike plate and lock assembly are configured to be installed such that the electronic lockset is in a locked position when the locking tab is in alignment with the retaining groove and is in the extended position.

In yet another aspect, a method for operating an electronic lockset installed on a sliding door is disclosed. The method comprises receiving, at a processor of the electronic lockset, a wireless actuation message from a control device, the electronic lockset having a strike plate with a retaining groove installed on a top portion of the sliding door, and a lock assembly comprising a locking tab in mechanical communication with a motor to actuate the locking tab between an extended position and a retracted position, the motor in electrical communication with the processor, actuating, in response to the wireless actuation message, the electronic lockset to extend the locking tab to the extended position, and aligning the locking tab with the retaining groove of the strike plate. The electronic lockset is in a locked position when the locking tab is aligned with the retaining groove of the strike plate and the locking tab is in the extended position.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
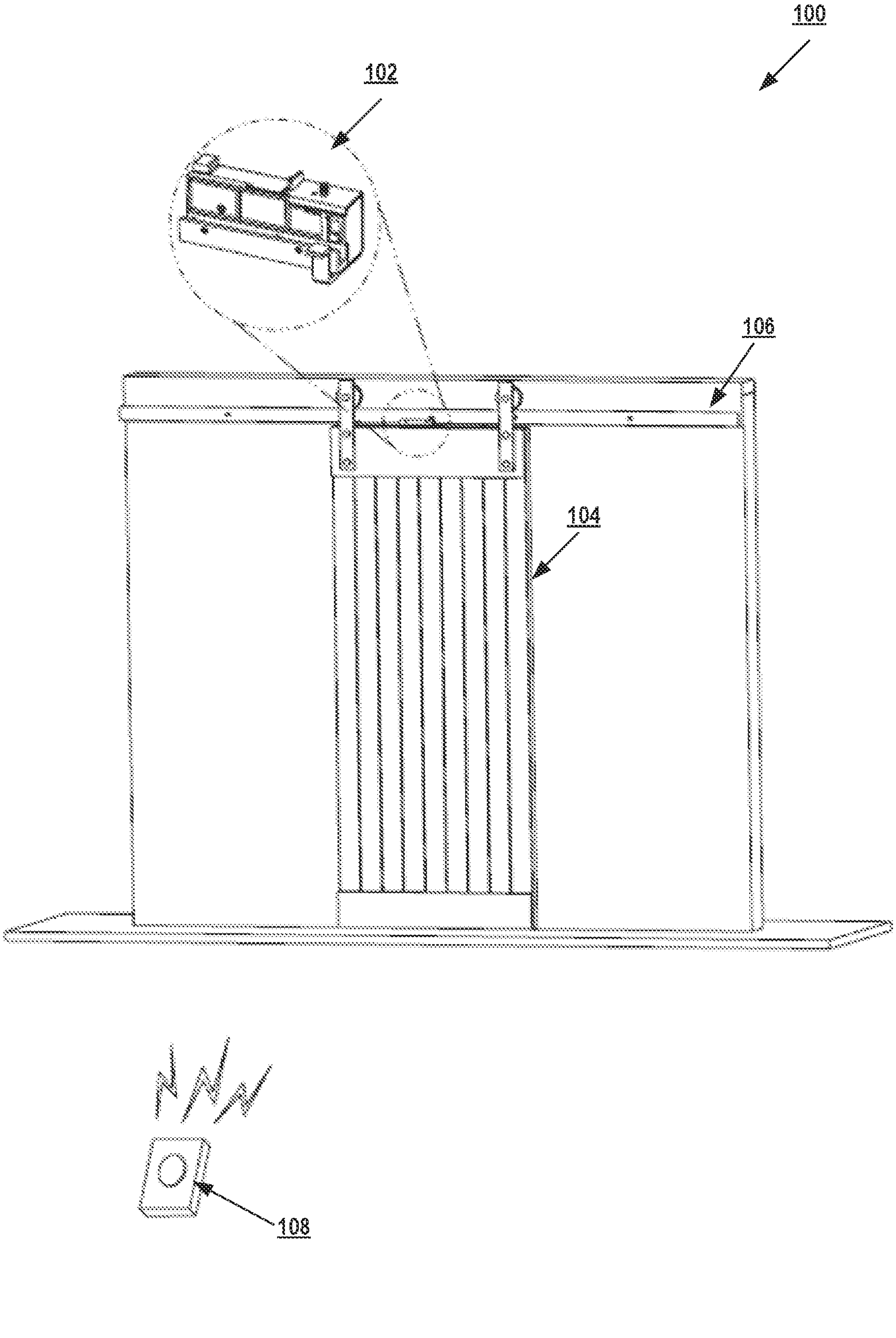
FIG. 1 illustrates an example embodiment of an electronic lockset installed on a sliding door.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The electronic lockset described herein is configured to be installable on a sliding door, regardless of whether the sliding door is mounted inside the room or outside the room. In addition, the electronic lockset described herein may include an alternative unlock/lock feature, and/or an emergency unlock feature that can be used in emergency situations to unlock the lock from either side of the room. In some embodiments, the electronic lockset is installed the same regardless of whether the sliding door is inside or outside the room. In some embodiments, the electronic lockset, once installed, is non-intrusive, with the main body the lockset assembly hidden behind a rail of a sliding door. In general, the electronic locksets disclosed herein are designed to operate on interior sliding doors. However, in some embodiments, the electronic lockset operates similarly on an exterior door (e.g., exterior barndoor for a shed, garage, dog crate etc.).

FIG. 1 illustrates an example environment 100 for an electronic lockset installed on a sliding door. The environment 100 includes an electronic lockset 102, a sliding door 104 mounted with a rail 106, and a control device 108.

The sliding door 104 can be mounted on the inside of the room or the outside of the room. The installation of the electronic lockset 102 is the same regardless of which side of the room the door is mounted on and the electronic lockset 102 can provide privacy to either side of the door. The sliding door is mounted with a rail 106 (sometimes referred to as a track), which allows the door to slide in order to open or close a space. In the example shown, the sliding door 104 is in a closed position. In some embodiments, the sliding door 104 is a barn door.

The electronic lockset 102 is installed behind the rail 106. In some embodiments, the electronic lockset 102, when installed, is hidden or nearly hidden behind the rail 106. The electronic lockset 102 operates an electric motor to extend and retract a locking tab as part of locking and unlocking the sliding door 104. A schematic diagram of an example electronic lockset is illustrated and described in reference to FIG. 2. Further examples are also illustrated and described herein.

In the embodiment shown, the electronic lockset 102 is in wireless communication with the control device 108. In some embodiments, the control device 108 is a device with a single button (toggling between lock and unlock) or two or more buttons (e.g., an unlock button and a lock button). The control device 108 sends an actuation command to the electronic lockset 102. In some embodiments, the control device 108 communicates directly with the electronic lockset 102. For example, the control device 108 can wirelessly connect with the electronic door lock using a low energy local communication network. For example, Bluetooth® or Bluetooth Low Energy (BLE). In some embodiments, the control device 108 connects to the electronic lockset 102 via a local Wi-Fi network. In some embodiments, one or both of the control device 108 and the electronic lockset 102 are connected to each other via a bridge device plugged into a power source. For example, one or both of the control device 108 and the electronic lockset 102 are connected to the bridge device over Bluetooth®. In some of these embodiments, the bridge device further connects to the Internet over a Wi-Fi access point or a wired access point. In some embodiments, the control device 108 is a mobile computing device (e.g., smart phone, tablet, smart watch, etc.) or a smart home device (e.g., smart home hub or voice assistant device). In these embodiments, the control device 108 communicates with the electronic lockset 102 over the Internet, over a local network/protocol (BLE, or Bluetooth®), or combinations thereof. Some embodiments include multiple control devices. For example, rooms on both sides of the door may have a control device, or multiple mobile computing devices, smart home devices, other computers, etc. may control the electronic lockset 102.

In some embodiments, the control device 108 is remote from the electronic lockset 102. In some embodiments, the control device 108 is configured to be mounted on a wall. In some embodiments, the control device 108 is a wireless remote control. In some embodiments, a base, configured to be mounted on a wall, receives the control device 108 to removably attach the control device 108 to the wall.

Figure 2:
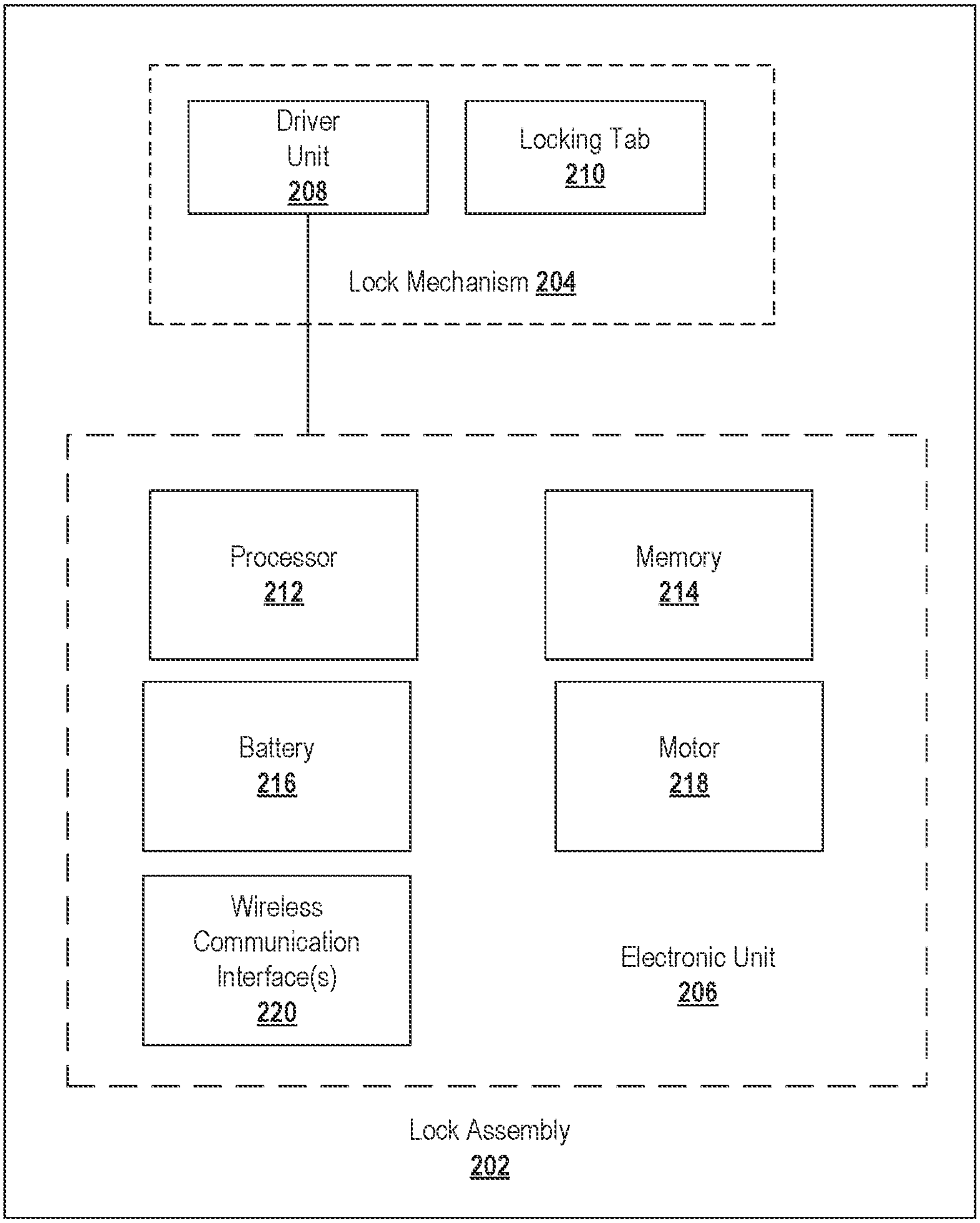
FIG. 2 is a schematic diagram of a lock assembly, according to an example embodiment.

FIG. 2 is a schematic diagram of a lock assembly 202. In some embodiments, the lock assembly is part of the electronic lockset 102 illustrated and described in reference to FIG. 1. The lock assembly 202 includes a lock mechanism 204 and an electronic unit 206. The lock mechanism includes a driver unit 208 which moves a locking tab 210 in response to a stimulus from the electronic unit 206. The electronic unit 206 includes a processor 212, a memory 214, a battery 216, a motor 218, and a communication interface (s) 220.

The lock mechanism 204 includes the mechanical components which operate to move the locking tab 210 between a retracted position and an extended position. The lock mechanism includes the driver unit 208 which moves the locking tab 210 between a retracted and extended positions. In some embodiments, the driver unit 208 interfaces with the motor 218 to actuate the extending or retracting movement. In some embodiments, the driver unit 208 further includes a manual interface which allows a user to manually actuate the locking or unlocking movement. The locking tab 210 is a part which, when extended into a retaining groove of a strike plate, blocks the sliding door from moving from a closed position. In some embodiments, the electronic lockset is in a locked position when the locking tab 210 is aligned with the retaining groove and is in the extended position. In some embodiments, the electronic lockset is in an unlocked position when the locking tab 210 is in the retracted position and when the locking tab 210 is not aligned with the retaining grove of the strike plate (in either an extended or retracted position).

The electronic unit 206 includes the electrical components of the lock assembly 202. In the example shown, the electronic unit 206 includes a processor 212, a memory 214, a battery 216, and a motor 218.

The processor 212 is operable to execute a plurality of software instructions (e.g., firmware) that, when executed by the processor 212, cause the lock assembly 202 to implement the methods and operate and have functionality as described herein. The processor 212 may comprise a device commonly referred to as a microprocessor, central processing unit (CPU) digital signal processor (DSP), or other similar device that may be embodied as a standalone unit or as a device shared with components of the electronic unit 206. The processor 212 may include memory for storing the software instructions, or the electronic unit 206 may further comprise a separate memory (e.g., the memory 214) for storing the software instructions.

In the embodiment shown, the electronic unit includes a separate memory 214 which stores software instructions for the lock assembly 202. In some embodiments, the memory 214 is electrically connected to the processor 212 for bi-directional communication of the instructions, data, and signals therebetween.

The battery 216 operates to power the electronic unit 206, including each of the processor 212, the memory 214, the motor 218, and the wireless communication interface(s) 220. In alternative embodiments, a different power source (e.g., wired to an outlet) can be used. The battery 216 can include one or more disposable or rechargeable batteries.

The motor 218 is an electrical motor. The motor 218 is energized to power the driver unit 208 to move the locking tab 210. The motor 218 is in electrical communication with the processor 212 which provides an actuation command (e.g., via electrical signals) to the motor 218 to activate the motor in a specified direction.

The wireless communication interface(s) 220 allows the electronic unit 206 to wirelessly communicate with an external device through one or more desired wireless communication protocols. In some examples, an external device can wirelessly control the operation of the lock assembly 202, such as operation of the locking tab 210. The electronic unit 206 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the wireless communication interface(s) 220 allows the electronic unit 206 to wirelessly communicate with networked and/or distributed computing systems, such as may be present in a cloud-computing environment. For example, by connecting with a local Wi-Fi access point for the Internet directly or via a Bluetooth to Wi-Fi bridge.

Figure 3:
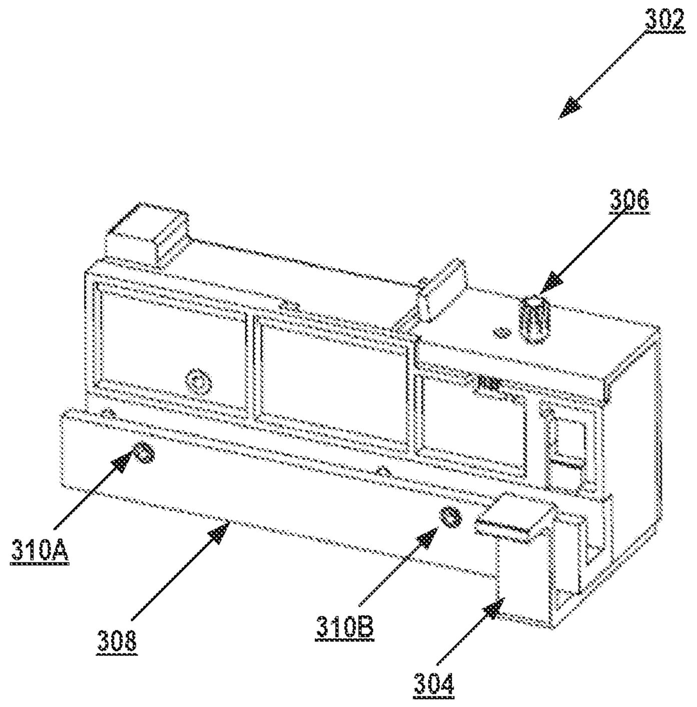
FIG. 3 illustrates an exterior view of an example lock assembly.

FIG. 3 illustrates an exterior view of an example lock assembly 302. An exterior view of the lock assembly 302 includes a locking tab 304, a knob 306 for manually actuating the lock assembly, and a mounting plate 308 with mounting holes 310A and 310B.

The locking tab 304 is another example of the locking tab 210 illustrated and described in FIG. 2. The locking tab 304 is configured to extend between an extended position and a retracted position in response to a stimulus from a motor (not shown) or the knob 306. The knob 306 can be rotated in one direction to extend the locking tab 304 and in the opposite direction to retract the locking tab 304. In some embodiments, the knob 306 is rotated as a manual override of the electronic actuation. For example, a manual override may be desired in case the battery runs out of power or the electronic unit of the lock assembly stops working. In some embodiments, the knob 306 is also used to configure the locking tab to extend to the correct position based on the position of the lock assembly 302 to a strike plate installed on the door, for example to accommodate different heights, or distances, between mounted positions of the lock assembly 302 and a strike plate, described below.

The mounting plate 308 operates to mount the lock assembly 302 to a rail of the sliding door. In some embodiments, the mounting plate 308 is interchangeable to match a shape, material, and/or color of the rail. In other embodiments, the mounting plate 308 is configured to universally attach to a rail of a sliding door. In the embodiment shown, the mounting plate 308 attaches to a rail via two setscrews through mounting holes 310A and 310B of the mounting plate. The setscrews allow for the adjustment of the lock assembly 302 without damaging the sliding door or the rail. For example, the position of the lock assembly 302 on the rail of the door may need to be adjusted to properly align the locking tab 304 with a strike plate installed on top of the sliding door at an appropriate location, for example, at a position where the door is in a closed position.

Figure 4:
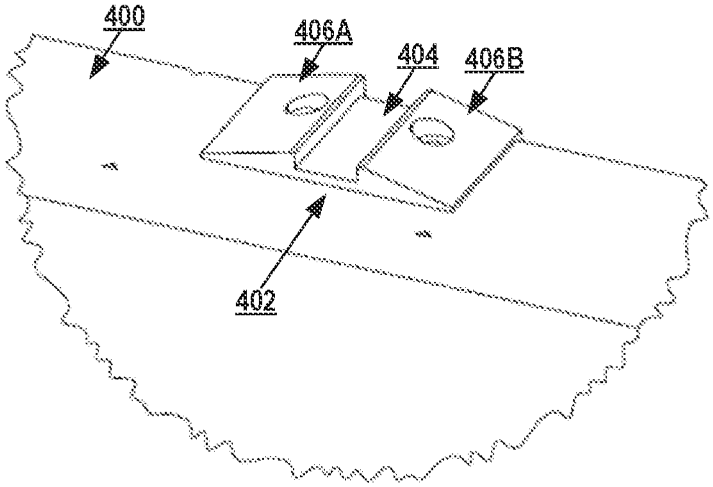
FIG. 4 illustrates a strike plate installed on top of a door.

FIG. 4 illustrates a strike plate 402 mounted on top of a sliding door 400. The strike plate includes a retaining groove 404 and ramps 406A and 406B. In the embodiment shown, the strike plate is mounted to a top portion of the sliding door 400 with two screws.

The retaining groove 404 operates to prevent the sliding door from sliding when a locking tab (e.g., locking tab 210, 304) is in an extended position and is aligned with the retaining groove 404 (e.g., when the electronic lockset is in a locked position). In some embodiments, the retaining groove 404 is slightly wider than the locking tab to provide a margin of error on the alignment of the locking tab and the retaining groove 404, while only allowing a small amount of door movement while the electronic lockset is in the locked position.

The ramps 406A and 406B operate to provide an upward force to guide the locking tab (e.g., locking tab 210, 304) towards the retaining groove 404 while the door is sliding towards a closed position, where the locking tab is aligned with the retaining groove 404 in the closed position. For example, the locking tab may follow the ramp up until the locking tab is aligned with the retaining groove 404 such that the locking tab drops into the retaining groove 404 (e.g., pushed down via a force from a spring inside the lockset). In the embodiment shown, the strike plate 402 includes a ramp 406A, 406B on both sides of the retaining groove 404. This allows for universal installation and/or for the sliding door to open in either direction. However, in some embodiments, only a single ramp is required to interface with the locking tab as the sliding door moves from an open position to a closed position.

In the embodiment shown, the strike plate 402 is installed towards the interior side of the sliding door to further enhance the low profile look of the strike plate from the perspective of a user.

Figure 5:
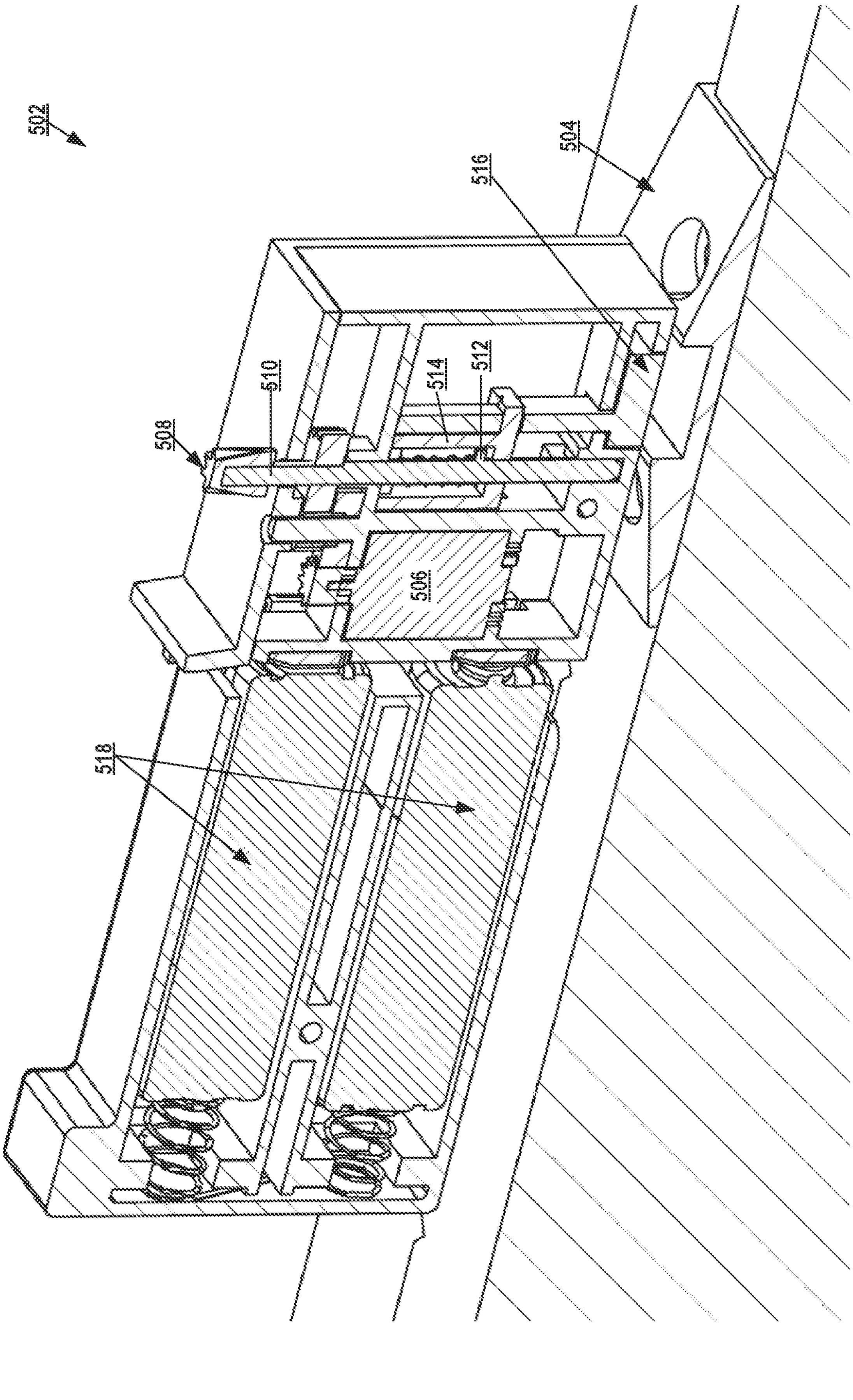
FIG. 5 illustrates an interior perspective view of the lock assembly.
Figure 6A:
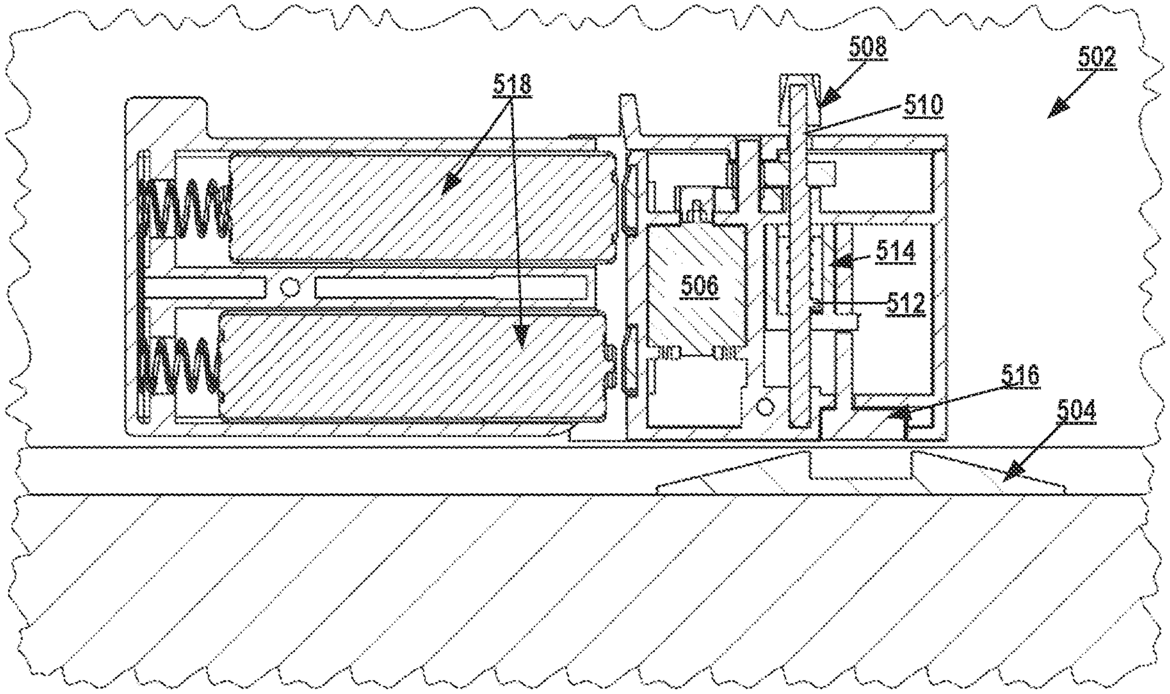
FIG. 6A illustrates an interior perspective view of the electronic lockset of FIG. 1 in an unlocked position.
Figure 6B:
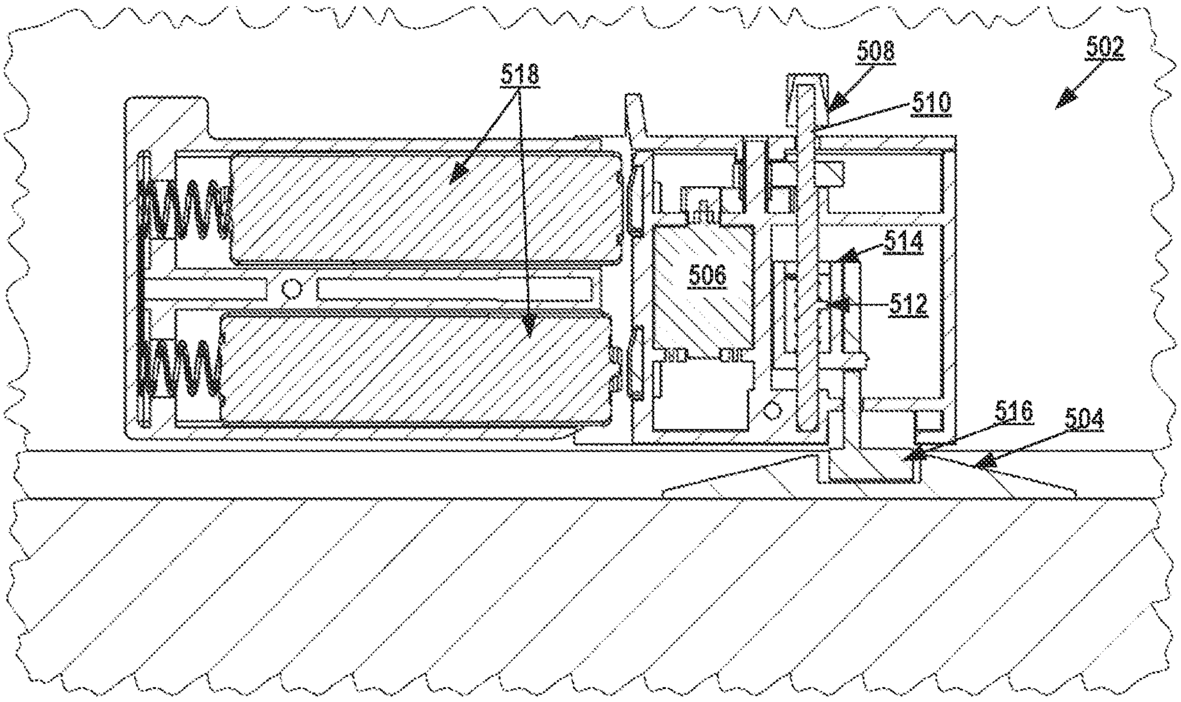
FIG. 6B illustrates an interior perspective view of the electronic lockset of FIG. 1 in a locked position.

FIGS. 5-7B illustrate interior perspective views of an example lock assembly 502. The lock assembly 502 is part of an electronic lockset (e.g., the electronic lockset 102 shown in FIG. 1) for sliding doors. The lock assembly 502 is another example of the lock assembly 302 shown in FIG. 3, and the lock assembly 202 shown in FIG. 2. Also shown in FIGS. 5-6B is a strike plate 504 of the electronic lockset, which is another example of the strike plate 402 shown in FIG. 4.

Figure 7A:
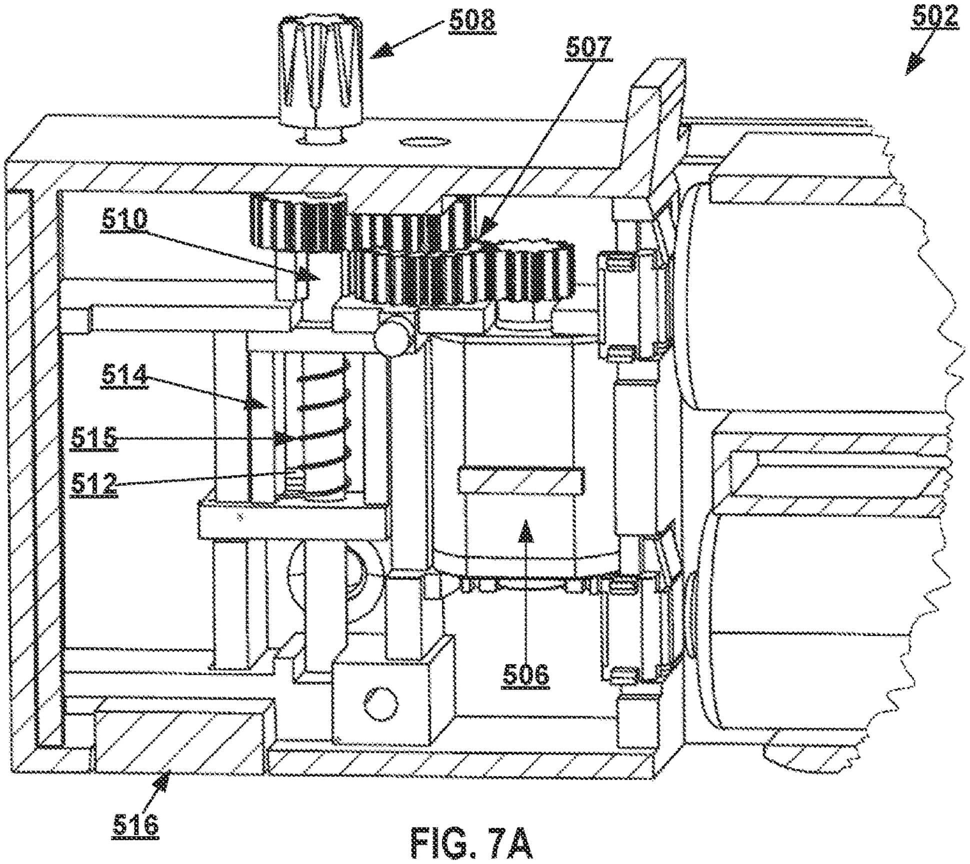
FIG. 7A illustrates another interior perspective view of the electronic lockset of FIG. 1 in an unlocked position.
Figure 7B:
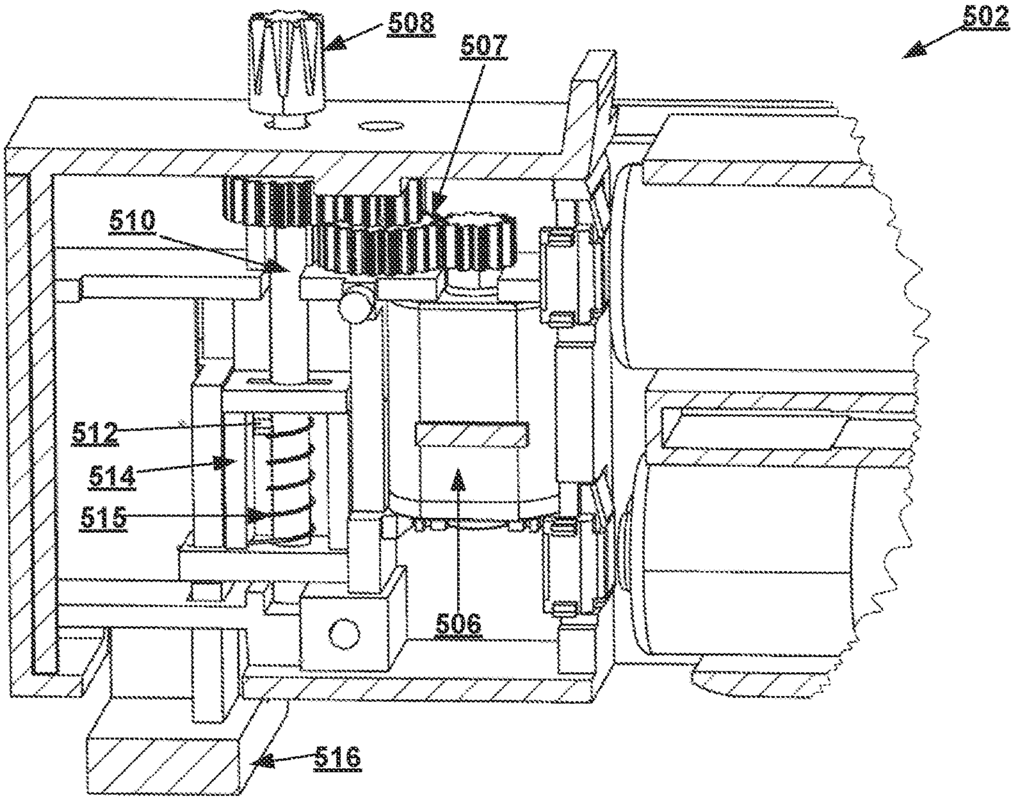
FIG. 7B illustrates another interior perspective view of the electronic lockset of FIG. 1 in a locked position.

FIGS. 5, 6A, and 7A show the door in a closed position with a locking tab 516 in a retracted position. FIGS. 6B and 7B show the locking tab in an extended position. FIG. 6B shows the electronic lockset in a locked position with the locking tab 516 in the extended position and aligned with a retaining groove of the strike plate 504. The electronic lockset is in an unlocked position when either: (1) the locking tab 516 is in a retracted position (e.g., as shown in FIGS. 5, 6A, and 7A); or (2) when the locking tab is not aligned with the retaining groove of the strike plate 504.

The lock assembly 502 includes a motor 506 in mechanical communication with a shaft 510 with a pin driver 512, a knob 508 attached to the shaft 510, a retaining box 514, a locking tab 516, and batteries 518. FIGS. 7A and 7B show the motor 506 in mechanical communication with the shaft 510 via gears 507. The retaining box 514 includes a spring 515 (for example, as shown in FIGS. 7A and 7B).

In the embodiment shown, the motor 506 is in mechanical communication with the shaft 510 to rotate the shaft 510. The motor 506 is powered by the batteries 518. In some embodiments, the motor 506 includes a drive shaft which rotates the gears 507 (as shown in FIGS. 7A-7B) in mechanical communication with the shaft 510. The shaft is also connected to the knob 508 to provide a manual override feature for the lock assembly 502. In some embodiments, the shaft 510 is rotated in one direction to move the locking tab 516 to an extended position and an opposite direction to move the locking tab 516 to a retracted position. In the embodiments shown, the shaft 510 can be rotated by the motor 506 or manually via the knob 508.

The shaft 510 passes through the retaining box 514 and includes a pin driver 512 inside the retaining box 514. The retaining box includes a spring 515 where the shaft passes through the spring 515 with the pin driver 512 extending outwards from the shaft 510 past a coil in the spring 515. The retaining box 514 is coupled to the locking tab 516. In some embodiments, ends of the spring 515 are fixed within the retaining box to prevent the spring from rotating with the pin driver 512.

FIGS. 6A and 7A illustrate the interior perspective view of the lock assembly 502 with the locking tab 516 in the retracted position. The pin driver 512 is positioned near the bottom of the retaining box 514. As the shaft 510 rotates in direction to move the locking tab 516 to the extended position, the pin driver 512 rotates through the coil in the spring 515 providing a downward force on the retaining box 514 and driving the retaining box 514 and the coupled locking tab 516 to the extended position. As discussed herein, the shaft 510 is configured to rotate in response to the activation of the motor 506 or the manual turning of the knob 508.

FIGS. 6B and 7B illustrate the interior perspective view of the lock assembly 502 with the locking tab 516 in the extended position. To move the locking tab from the extended position to the retracted position, the shaft is rotated to have the pin driver 512 move down the spring 515 providing an upward force on the retaining box 514 and the coupled locking tab 516.

The pin driver 512 can be located along different portions of the spring 515 depending on the distance between the lock assembly 502 and the retaining groove of the strike plate 504. This allows the electronic lock to be installed on a variety of different sliding doors because the locking tab 516 can be extended to any position within the margin of the retaining box. Additionally, in some embodiments, the locking tab 516 is replaceable with other locking tabs at different lengths allowing for the electronic lockset to be configured to operate with many different types and configurations of sliding doors. In some embodiments, the knob 508 is rotated during installation to adjust the movement distance of the locking tab 516. In other embodiments, this configuration is done automatically. For example, the lock assembly may include a sensor (e.g., a pressure sensor) that sends signals to a processor to determine that the locking tab 516 has reached a locked/unlocked position and configure the motor to actuate the locking tab the determined distance.

In the embodiments shown in FIGS. 5-6B, the locking tab 516 of the lock assembly 502 is aligned with the retaining grove of the strike plate 504. Typically, the strike plate 504 and the locking tab 516 are installed such that the locking tab 516 and retaining groove of the strike plate are aligned when the sliding door is in a closed position. In some embodiments, the closed position includes a position where the sliding door has a stopper at the closed position (preventing the door from further sliding past the closed position). In some of these embodiments, the stopper is part of an end portion of the rail. In other embodiments, the sliding door may be opened in either direction, and the user may be required to align the locking tab 516 with the retaining groove of the strike plate 504.

In some embodiments, the strike plate 504 includes one or two ramps (e.g., as shown in the example of FIG. 4). The ramps assist with the alignment of the locking tab 516 in the retaining groove of the strike plate 504 by providing an upward force on the locking tab 516, compressing the spring 515 between the bottom portion of the retaining box 514 and the pin driver 512 as the sliding door moves towards the closed position. Once the locking tab reaches alignment with the retaining groove of the strike plate 504, the spring decompresses, returning the locking tab 516 to the locked position within the retaining groove of the strike plate 504 (e.g., by providing a downward force on the locking tab 516).

In alternative embodiments, the lock assembly includes a sensor which is used to prevent the actuation of the locking tab 516 until the locking tab is in an aligned position with the retaining groove of the strike plate 504. In these alternative embodiments, the retaining groove of the strike plate 504 may include a magnet to assist the sensor detect alignment of the retaining groove of the strike plate 504. Additionally, magnets on the rail or door, ridges on the rail, or a stopper on the rail or door, may be included on the sliding door or may be installed such to assist with the alignment of the locking tab 516 and the retaining groove of the strike plate 504.

In some embodiments, the knob 508 provides a manual override of the electrical actuation. In typical embodiments, the lock assembly 502 is installed behind a rail of the sliding door. The knob is conveniently located to remain hidden during normal operation while being accessible in the event the electronic lockset runs out of power or when there is an electrical (e.g., motor failure) or software failure. In some embodiments, in the event of a failure or loss of power, the user may use the manual override feature to keep the locking tab 516 in a retracted position until the error is fixed or the battery is replaced/recharged. For example, the locking tab 516 may semi-permanently be placed in a position to clear the retaining groove of the strike plate. Once the lock assembly returns to a functional state, no other adjustments are required and the normal operation of the lock can resume. For example, if the electronic lockset runs out of battery power, a user can manually turn the knob to place the locking tab in a retracted position and, once the batteries are replaced, the electronic lockset returns to a functional state with the electrical actuation.

In some embodiments, a control device sends an actuation command to the electronic unit of the lock assembly, where a processor receives the actuation command and triggers the motor 506 to rotate the shaft 510 via the gears 507, causing the pin driver 512 to travel either downwards through the coils of the spring 515 to move the locking tab to the retracted position or upwards through the coils of the spring 515 to move the locking tab to the extended position. In some embodiments, the spring 515 includes spring ends which are fixed to edges of the retaining box 514 such that the spring 515 will not rotate due to friction from the movement of the pin driver 512. The pin driver rotating through the coils in the spring 515 provides a force to move the retaining box 514 and the coupled locking tab. This actuation can also be powered manually by a user turning the knob 508 instead of from the motor 506.

Figure 8:
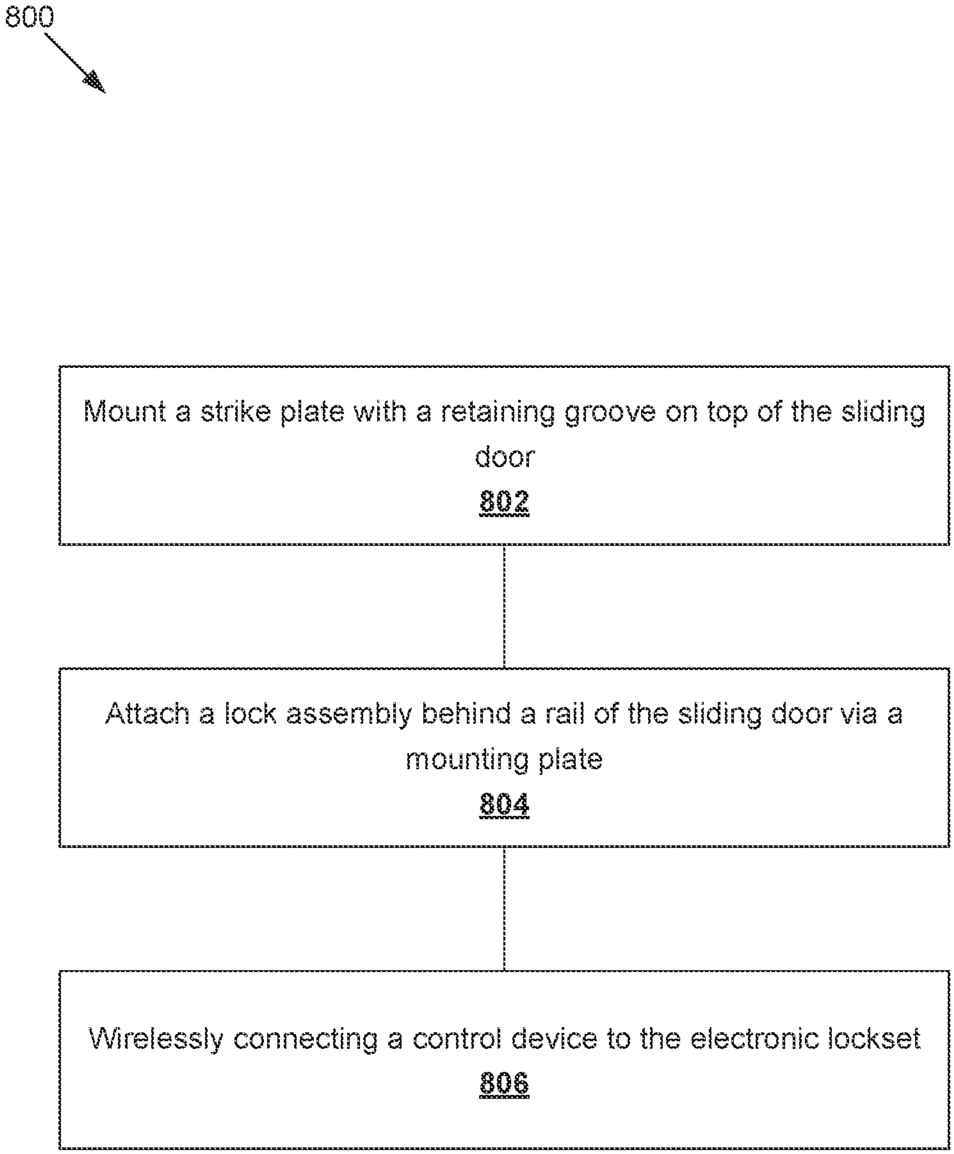
FIG. 8 illustrates an example method for installing the electronic lockset.

FIG. 8 illustrates an example method 800 for installing the electronic lockset. The method 800 includes the operations 802, 804, and 806. In some embodiments, the method for installing the electronic lock is the same regardless of whether the sliding door is mounted on the exterior or interior side of the secured space. Additionally, in some embodiments, the lock requires minimal door preparation as part of the installation method. For example, no parts or cuts are required to be drilled into the door frame (e.g., a mortise cut, etc.). In some embodiments, no special installation tools are required. Additionally, the electronic lockset can be installed and configured to remain mostly hidden from the perspective of a user.

The operation 802 mounts a strike plate with a retaining groove on top of the sliding door. In some embodiments, the strike plate is mounted with one or more screws. In some embodiments, the strike plate is mounted adjacent to the top end closer to the interior side of the sliding door to reduce or eliminate the visibility of the strike plate. In alternative embodiments, the strike plate is mounted on a bottom side of the door with the lock assembly attached to the floor. In alternative embodiments, the strike plate can be mounted using an adhesive or other connector.

The operation 804 attaches a lock assembly behind a rail of the sliding door. In some embodiments, the lock assembly is mounted with a mounting plate which attaches to the rail of the sliding door. In some embodiments, the mounting plate attaches to the rail using one or more setscrews. The setscrews allow for the adjustment of the lock assembly without damaging the rail. In some embodiments, the mounting plate can be interchanged with other mounting plates to match a color, style, and/or shape of the rail. In alternative embodiments, the lock assembly can be installed using other connectors, such as magnets or adhesives.

The operation 804 includes aligning the lock assembly with the strike plate. In some embodiments, the lock assembly and strike plate can be mounted at any location (or at several different locations) along the rail of the sliding door so long as the locking tab and the retaining groove of the strike plate are aligned when the door is in a closed position. In some embodiments, a user may desire to lock the sliding door in an open position. In these embodiments, during the installation process, the strike plate and lock assembly are aligned with the door in the desired open position.

The operation 806 wirelessly connects a control device to the electronic lockset. In some embodiments, the operation includes wirelessly pairing the control device with the electronic lockset. In some embodiments, the operation 806 includes connecting the electronic lockset and/or the control device to the Internet, either directly or via a Wi-Fi bridge. In some embodiments, connecting the electronic lockset to the Internet allows for various smart home functions and automations, including remote access/monitoring. In alternative embodiments, the control device and the electronic lockset are connected via a wired connection.

Figure 9A:
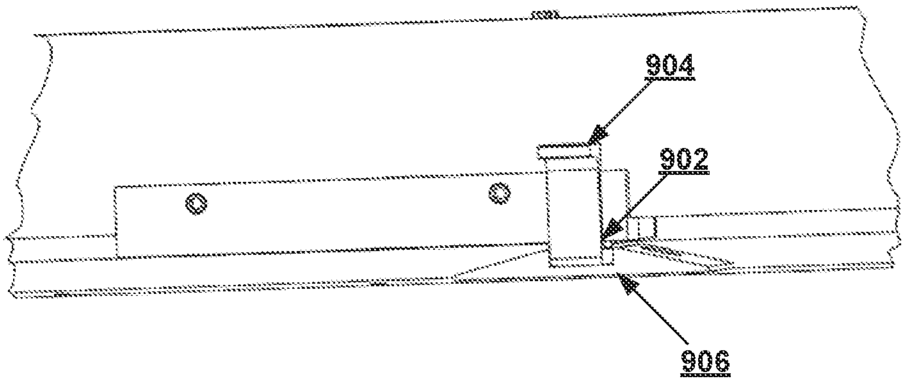
FIG. 9A illustrates an emergency access feature of the electronic lockset of FIG. 1 from the exterior side of the sliding door when the electronic lockset is in a locked position.
Figure 9B:
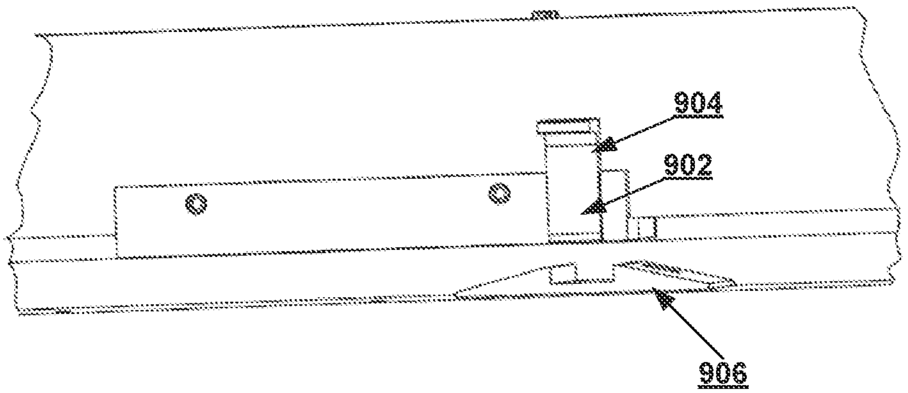
FIG. 9B illustrates an emergency access feature of the electronic lockset of FIG. 1 from the exterior side of the sliding door when the electronic lockset is in an unlocked position.
Figure 10A:
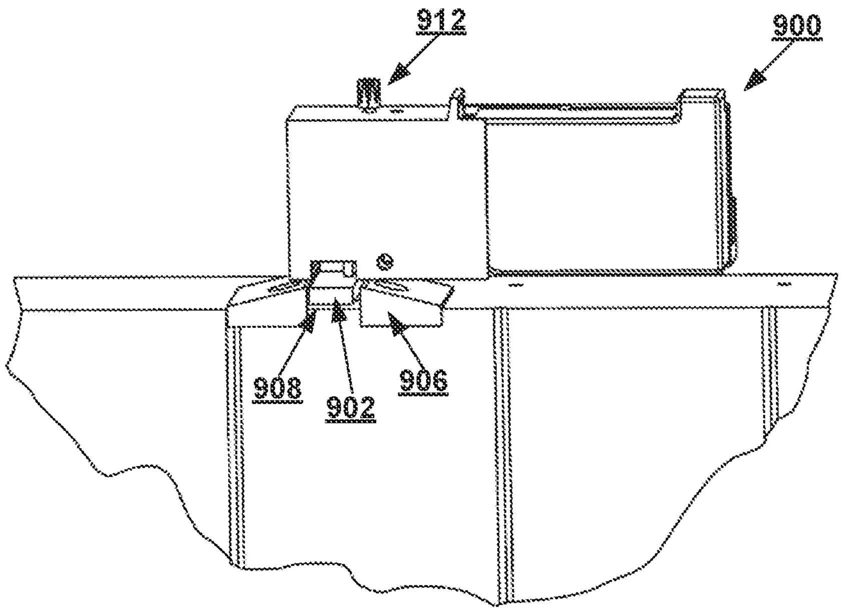
FIG. 10A illustrates an emergency access feature of the electronic lockset of FIG. 1 from the interior side of the sliding door when the electronic lockset is in a locked position.
Figure 10B:
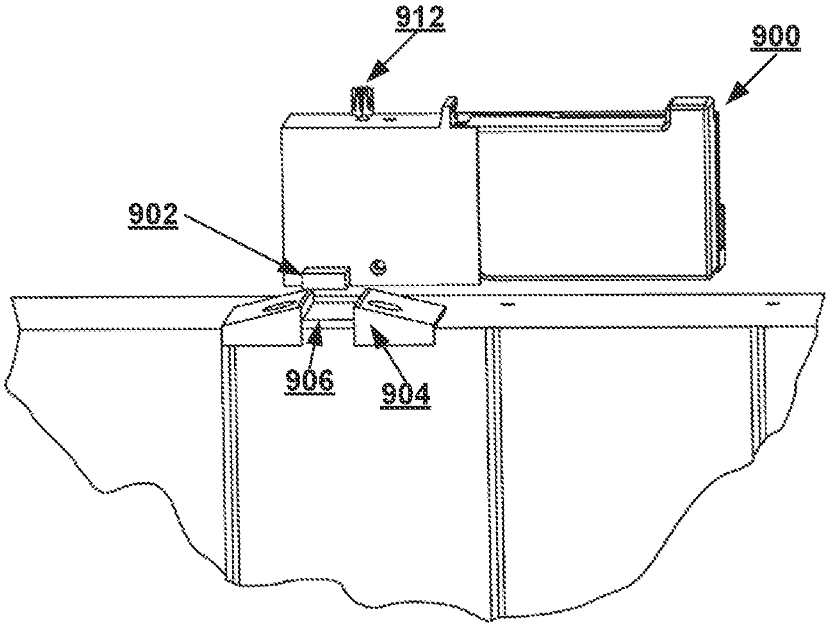
FIG. 10B illustrates an emergency access feature of the electronic lockset of FIG. 1 from the interior side of the sliding door when the electronic lockset is in an unlocked position.

FIGS. 9A-10B illustrate an emergency access feature of the electronic lockset from the exterior side of the sliding door. FIGS. 9A and 9B illustrate an emergency access feature of the electronic lockset from the exterior side of the sliding door. FIGS. 10A and 10B illustrate an emergency access feature of the electronic lockset from the interior side of the sliding door. In some examples, the emergency access feature allows a user to access the other side of the door without damaging the integrity of the lock in case of a lock failure or an emergency.

Referring to FIGS. 9A and 9B, a locking tab 902 includes an extended portion 904 exterior to the door. FIG. 9A shows the electronic lockset in a locked position with the locking tab 902 in an extended position, and FIG. 9B shows the electronic lockset in an unlocked position in response to an upward force being applied to the extended portion 904. FIG. 9A shows the locking tab in the extended position aligned with a retaining groove of a strike plate 906. A user can press upward on the extended portion 904 such that the locking tab 902 clears the retaining groove in the strike plate 906, as shown in FIG. 9B. In some embodiments, when the extended portion 904 is pressed upwards, the spring 515 is compressed between the pin driver 512 and the bottom end of the retaining box 514, as shown in the examples of FIGS. 5-7B, allowing the locking tab to clear the retaining groove of the strike plate 906 and freeing the sliding door to open.

Referring to FIGS. 10A and 10B, the locking tab 902 includes an extended portion 908 interior to the door. The extended portion 908, like the extended portion 904, allows a user to press upward on the locking tab 902 to clear the retaining groove of the strike plate 906, such that a user can move the sliding door. FIG. 10A shows the locking tab 902 in the extended position with the electronic lockset in the locked position, and FIG. 10B shows the electronic lockset in the unlocked position in response to an upward force being applied to the extended portion 908. In some embodiments, when the extended portion 904 is pressed upwards, the spring 515 is compressed between the pin driver 512 and the bottom end of the retaining box 514, as shown in the examples of FIGS. 5-7B, allowing the locking tab to clear the retaining groove of the strike plate 906.

In some embodiments, a lock assembly 900 includes a manual override 912. In these embodiments, the extended portion 908 is not required to manually unlock the door from the interior side. However, in some examples, the extended portion 908 may be desire to quickly and conveniently open the sliding door. For example, the lock assembly 900 may be positioned behind a rail of the sliding door and, depending on the configuration of the door, may be difficult to access (e.g., without a ladder). Accordingly, in many embodiments, the extended portion 908 provides a method for quickly unlocking the sliding door. Additionally, in some embodiments, the electronic lockset does not include an emergency access feature on either side of the sliding door.

Figure 11A:
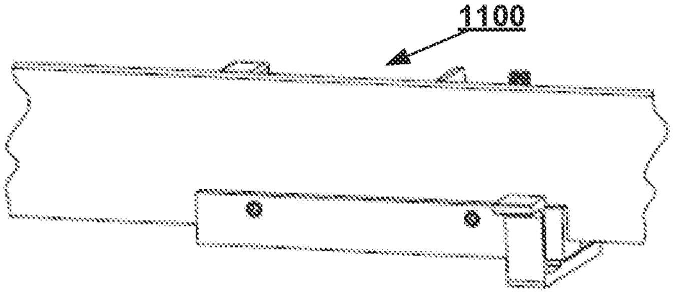
FIG. 11A illustrates a first view of a battery installation process for the electronic lockset of FIG. 1.
Figure 11B:
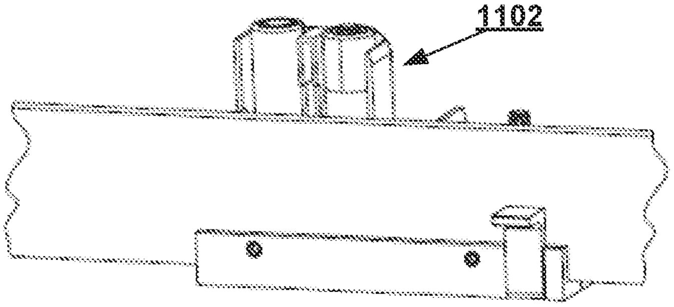
FIG. 11B illustrates a second view of a battery installation process for the electronic lockset of FIG. 1.
Figure 11C:
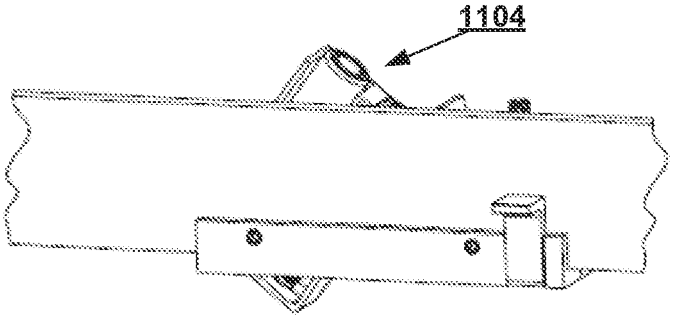
FIG. 11C illustrates a third view of a battery installation process for the electronic lockset of FIG. 1.

FIGS. 11A-11C illustrate a battery installation process for the electronic lockset. In some embodiments, the chambers for the battery(s) are accessible by rotating a battery access chamber.

FIG. 11A shows a starting position 1100 of the battery chamber during a battery installation/replacement process. At the position 1100, the battery chamber is installed and locked. In the position 1100, the battery chamber and the electronic lockset are hidden behind the rail of the sliding door. The battery chamber can be rotated to access the chamber to install or replace the battery(s).

FIG. 11B shows a final position 1102 of the battery chamber during a battery installation/replacement process. When the battery chamber is in position 1102, it is fully rotated and accessible for the installation or replacement of the battery(s).

FIG. 11C shows a middle position 1104 of the battery chamber during a battery installation and/or replacement process. The position 1104 shows the battery chamber semi-rotated (e.g., as a middle position between the position 1100 and 1102).

The embodiment shown in FIGS. 11A-11B allows for the installation and/or replacement of battery(s) without requiring any tools or uninstalling the electronic lockset. In alternative embodiments, the battery chamber is removed in order to recharge an integrated battery. In some of these embodiments, the battery chamber is removed by similarly rotating the battery chamber.

Figure 12:
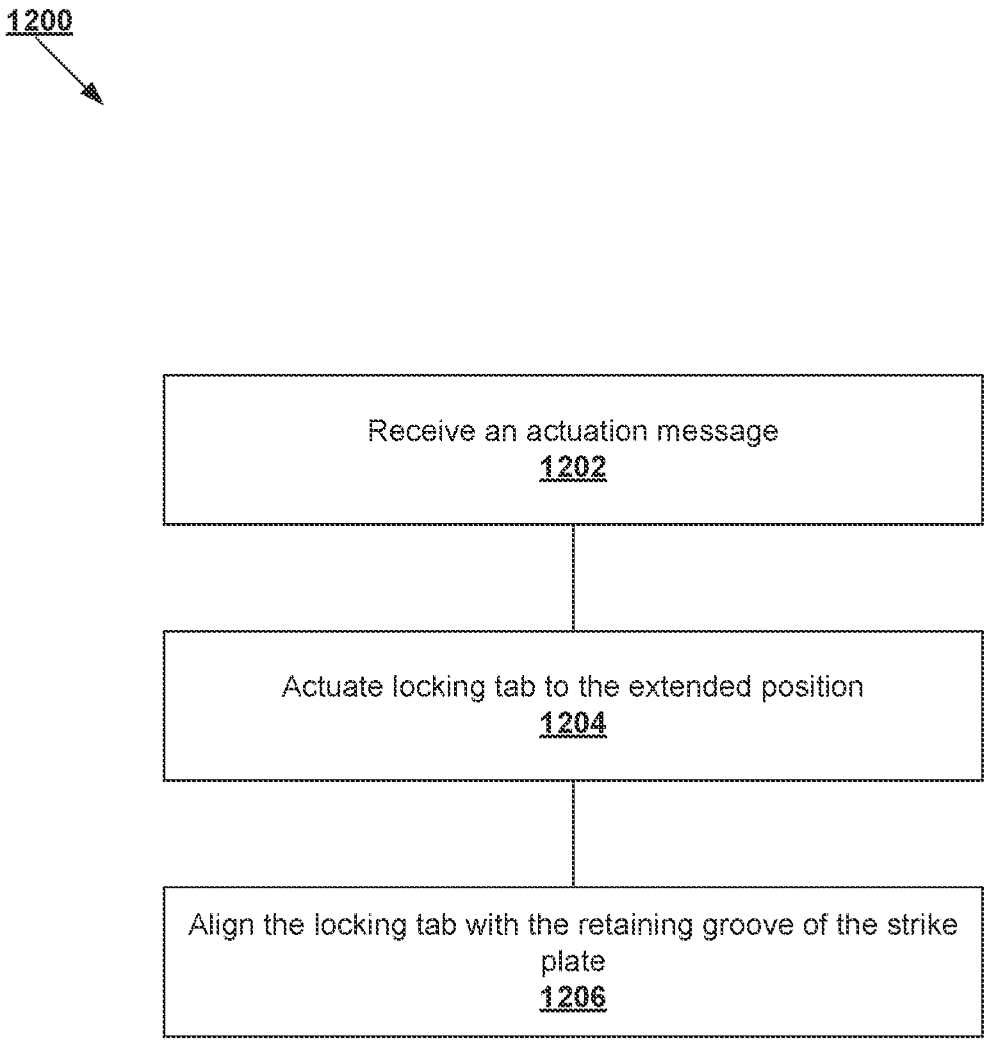
FIG. 12 illustrates an example method for operating an electronic lockset.

FIG. 12 illustrates an example method 1200 for operating the electronic lockset. The method 1200 includes the operations 1202, 1204, and 1206.

The operation 1202 receives an actuation message. In some embodiments, the actuation message is received from a control device. The operation 1204 actuates the locking tab to the extended position in response to receiving the actuation message. As described below in some embodiments, the electronic lockset is configured to allow the operations 1202 and 1204 to occur before or after the operation 1206.

The operation 1206 aligns the locking tab with the retaining groove of the strike plate. In some embodiments, moving the sliding door to a closed position aligns the locking tab with the retaining groove of the strike plate. In typical embodiments, the operation 1206 can occur both before the operations 1202, 1204 and after the operations 1202, 1204.

In some embodiments the operation 1206 occurs after the operations 1202 and 1204. For example, the locking tab is positioned in the extended position prior to aligning the locking tab with the retaining groove. In some of these examples, the strike plate includes at least one ramp which is configured to move the locking tab to the retaining groove of the strike plate when the locking tab is in the extended position. In some embodiments, the user actuates the electronic lockset to move the locking tab to the extended position, then moves the sliding door to the closed position to place the electronic lockset in the locked position.

In some embodiments, the operation 1206 occurs before the operations 1202 and 1204. For example, the locking tab (in the retracted position) is first aligned with retaining groove of the strike plate, then an actuation message is received and the locking tab is moved to the extended position, placing the electronic locket in the locked position.

Once the electronic lockset is in the locked position, it can be moved to the unlocked position by receiving another wireless actuation message and, in response, actuating the electronic lockset to retract the locking tab to the retracted position.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. An electronic lockset for a sliding door comprising:
- a strike plate with a retaining groove configured to be installed on a top portion of the sliding door; and
- a lock assembly configured to be installed on a rail of the sliding door comprising:
  - a body housing a motor and a shaft, the motor operationally coupled to the shaft for driving rotation of the shaft, wherein at least a portion of the shaft extends out of the body and includes a manual interface;
  - a locking tab in mechanical communication with the motor via the shaft to actuate the locking tab between an extended position and a retracted position relative to the body; and
  - a processor in wireless communication with a control device;
  - wherein the processor is configured to execute instructions to perform:
    - receiving an actuation command from the control device; and
    - actuating the locking tab between the retracted position and the extended position in response to the actuation command,
- wherein the strike plate and the lock assembly are configured to be installed such that the electronic lockset is in a locked position when the locking tab is in alignment with the retaining groove and is in the extended position.

2. The electronic lockset of claim 1, wherein the lock assembly is mountable along the rail at a position such that the locking tab is aligned with the retaining groove when the sliding door is at a closed position.

3. The electronic lockset of claim 1, further comprising:
- a pin driver coupled to the shaft, wherein the motor rotates the shaft to drive the pin driver and actuate the locking tab.

4. The electronic lockset of claim 3, wherein the manual interface includes a knob configured to rotate the pin driver to manually override the electronic lockset.

5. The electronic lockset of claim 3, further comprising;
- a retaining box connected to the locking tab with a spring,
- wherein the pin driver rotates through the spring to actuate the locking tab between the retracted position and the extended position.

6. The electronic lockset of claim 1, wherein the locking tab includes:

an extended portion configured to extend past a first side of the sliding door, wherein the extended portion is configured to provide emergency access to an opposite side of the sliding door when pressed.

7. The electronic lockset of claim 6 further comprising:

a retaining box coupled to the locking tab and having a spring; and a pin driver configured to drive the locking tab via the retaining box, wherein when the extended portion is pressed, the retaining box and the pin driver compress the spring allowing for the locking tab to move in an upward direction and clear the retaining groove of the strike plate.

8. The electronic lockset of claim 1, wherein the locking tab includes:

a first extended portion configured to extend past an exterior side of the sliding door; and a second extended portion configured to extend past an interior side of the sliding door, wherein the first extended portion is configured to provide emergency access to the interior side of the sliding door when pressed and the second extended portion is configured to provide emergency access to the exterior side of the sliding door.

9. The electronic lockset of claim 1, wherein the body of the lock assembly is configured to be hidden behind the rail of the sliding door when installed.

10. The electronic lockset of claim 9, wherein the body of the lock assembly is installed on the rail via a mounting plate.

11. The electronic lockset of claim 1, wherein the control device includes an input device and is remote from the electronic lockset.

12. The electronic lockset of claim 1, wherein the control device is a mobile computing device.

13. The electronic lockset of claim 2, wherein the strike plate includes at least one ramp adjacent to the retaining groove to allow the locking tab in the extended position to move to the locked position as the sliding door moves to the closed position from an open position.

14. The electronic lockset of claim 1, wherein the lock assembly includes a power source, and wherein the power source can be accessed without uninstalling the electronic lockset.

15. A method of installing an electronic lockset on a sliding door, the method comprising:

mounting a strike plate with a retaining groove on a top portion of the sliding door;

attaching a lock assembly behind a rail of the sliding door, wherein the lock assembly includes a body housing a motor and a shaft, the motor operationally coupled to the shaft for driving rotation of the shaft, wherein at least a portion of the shaft extends out of the body and includes a manual interface, the lock assembly also including a locking tab coupled to the motor via the shaft to actuate the locking tab between an extended position and a retracted position relative to the body; and wirelessly connecting a control device to the electronic lockset, wherein the control device is configured to send actuation commands to the electronic lockset to move the locking tab between the extended position and the retracted position, wherein the strike plate and the lock assembly are configured to be installed such that the electronic lockset is in a locked position when the locking tab is in alignment with the retaining groove and is in the extended position.

16. The method of claim 15, wherein the lock assembly is installed behind the rail via a mounting plate.

17. The method of claim 16, wherein the mounting plate attaches to the rail via at least one setscrew, wherein the at least one setscrew allows the mounting plate to be moved without damaging the rail.

18. The method of claim 15, wherein the electronic lockset is installed the same way when the rail is on the interior side of the sliding door and when the rail is on the exterior side of the sliding door.

19. The method of claim 15, wherein the locking tab is replaceable with locking tabs of different lengths to allow for installation of the electronic lockset on sliding doors with different clearances between the rail and the top portion of the sliding door.

20. A method for operating an electronic lockset installed on a sliding door, the method comprising:

receiving, at a processor of the electronic lockset, a wireless actuation message from a control device, the electronic lockset having:

a strike plate with a retaining groove installed on a top portion of the sliding door; and a lock assembly comprising a body housing a motor and a shaft, the motor operationally coupled to the shaft for driving rotation of the shaft, wherein at least a portion of the shaft extends out of the body and includes a manual interface, the lock assembly also comprising a locking tab in mechanical communication with the motor via the shaft to actuate the locking tab between an extended position and a retracted position relative to the body, the motor in electrical communication with the processor;

actuating, in response to the wireless actuation message, the electronic lockset to extend the locking tab to the extended position; and aligning the locking tab with the retaining groove of the strike plate, wherein the electronic lockset is in a locked position when the locking tab is aligned with the retaining groove of the strike plate and the locking tab is in the extended position.

* * * * *